United States Patent
Romana et al.

(10) Patent No.: US 11,113,091 B2
(45) Date of Patent: Sep. 7, 2021

(54) APPARATUS FOR FORWARDING A MEDIATED REQUEST TO PROCESSING CIRCUITRY IN RESPONSE TO A CONFIGURATION REQUEST

(71) Applicant: Arm Limited, Cambridge (GB)

(72) Inventors: Alexandre Romana, Roquefort les Pins (FR); Mario Torrecillas Rodriguez, Cambridge (GB); Eric Biscondi, Roquefort les Pins (FR)

(73) Assignee: Arm Limited, Cambridge (GB)

( * ) Notice: Subject to any disclaimer, the term of this patent is extended or adjusted under 35 U.S.C. 154(b) by 146 days.

(21) Appl. No.: 16/299,335

(22) Filed: Mar. 12, 2019

(65) Prior Publication Data
US 2020/0293350 A1 Sep. 17, 2020

(51) Int. Cl.
G06F 9/44 (2018.01)
G06F 9/455 (2018.01)

(52) U.S. Cl.
CPC .............. *G06F 9/45558* (2013.01); *G06F 2009/45587* (2013.01)

(58) Field of Classification Search
CPC ........................................................ G06F 9/44
See application file for complete search history.

(56) References Cited

U.S. PATENT DOCUMENTS

| | | | | |
|---|---|---|---|---|
| 5,937,185 A * | 8/1999 | Weir | ............ | G06F 13/105 703/24 |
| 8,015,287 B2 * | 9/2011 | Golan | ............ | H04L 63/20 709/225 |
| 10,084,784 B1 * | 9/2018 | Brandwine | ......... | G06F 9/45558 |
| 10,230,709 B1 * | 3/2019 | Kanakarajan | ............ | H04L 41/28 |
| 2006/0047958 A1 * | 3/2006 | Morais | ............ | G06F 21/51 713/166 |
| 2008/0141019 A1 * | 6/2008 | Honda | ............ | G06F 30/33 713/100 |
| 2010/0153089 A1 * | 6/2010 | Chrysanthakopoulos | | G06F 13/105 703/24 |
| 2010/0153823 A1 * | 6/2010 | Noda | ............ | H03M 13/033 714/777 |
| 2011/0202790 A1 * | 8/2011 | Rambo | ............ | G06F 3/0605 714/6.12 |

(Continued)

OTHER PUBLICATIONS

International Search Report and Written Opinion of the International Searching Authority for PCT/GB2020/050003 dated Apr. 2, 2020, 13 pages.

(Continued)

*Primary Examiner* — Jae U Jeon
(74) *Attorney, Agent, or Firm* — Nixon & Vanderhye P.C.

(57) ABSTRACT

An apparatus, method and computer program are described, the apparatus comprising processing circuitry configured to execute software, and an interface configured to receive, from the processing circuitry, a configuration request from first software requesting configuration of a virtualised device. In response to the configuration request, the interface is configured to forward a mediated request to the processing circuitry, and the mediated request comprises a request that second software having a higher privilege level than the first software determines a response to the configuration request received from the first software.

19 Claims, 15 Drawing Sheets

(56) References Cited

U.S. PATENT DOCUMENTS

| | | | | |
|---|---|---|---|---|
| 2015/0082305 A1* | 3/2015 | Hepkin | ............... | G06F 9/45558 718/1 |
| 2016/0139950 A1* | 5/2016 | Snyder, II | ............. | G06F 9/5011 718/103 |
| 2016/0292816 A1 | 10/2016 | Dong | | |
| 2018/0203609 A1* | 7/2018 | Krueger | ................ | G06F 3/0685 |

OTHER PUBLICATIONS

S. Vogl, "Secure Hypervisors" 2010, retrieved on Mar. 18, 2020 from https://pdfs.semanticscholar.org/9184/3e34d3e370a0a8c2c1d3ab0befebafeb1cc6.pdf, pp. 1-19.

R. Sailer et all, "sHype: Secure Hypervisor Approach to Trusted Virtualized Systems" IBM Research Report, Feb. 2, 2005, 12 pages.

* cited by examiner

APPARATUS FOR FORWARDING A MEDIATED REQUEST TO PROCESSING CIRCUITRY IN RESPONSE TO A CONFIGURATION REQUEST

BACKGROUND

Technical Field

The present technique relates to the field of data processing systems.

Technical Background

In a data processing system, dedicated hardware devices may be provided to perform specific tasks, and in some situations, there may be multiple users or multiple software applications sharing access to the same hardware device. The device may be virtualised so that each user or software application believes that they are the only one using the device, while in reality, resources in the device are partitioned to be shared among the multiple users.

SUMMARY

Viewed from one example, the present technique provides an apparatus comprising:
processing circuitry configured to execute software; and
an interface configured to receive, from the processing circuitry, a configuration request from first software requesting configuration of a virtualised device;
in which in response to the configuration request, the interface is configured to forward a mediated request to the processing circuitry; and
the mediated request comprises a request that second software having a higher privilege level than the first software determines a response to the configuration request received from the first software.

Viewed from another example, the present technique provides a method comprising:
executing software on processing circuitry;
receiving, from the processing circuitry, a configuration request from first software requesting configuration of a virtualised device;
in response to the configuration request, forwarding a mediated request to the processing circuitry;
in which the mediated request comprises a request that second software having a higher privilege level than the first software determines a response to the configuration request received from the first software.

Viewed from another example, the present technique provides an apparatus comprising:
means for executing software;
means for receiving, from the means for executing software, a configuration request from first software requesting configuration of a virtualised device;
in response to the configuration request, forwarding a mediated request to the means for executing software;
in which the mediated request comprises a request that second software having a higher privilege level than the first software determines a response to the configuration request received from the first software.

Viewed from another example, the present technique provides a computer program for controlling a host data processing apparatus to provide an instruction execution environment, the computer program comprising:
processing program logic configured to execute software; and
interface program logic configured to receive, from first software executing on the processing program logic, a configuration request requesting configuration of a virtualised device;
in which in response to the configuration request, the interface program logic is configured to forward a mediated request to second software executing on the processing program logic,
the second software has a higher privilege level than the first software, and
the mediated request comprises a request that the second software determines a response to the configuration request received from the first software.

Further examples, features and advantages of the present technique will be apparent from the following description of examples, which is to be read in conjunction with the accompanying drawings.

DESCRIPTION OF EXAMPLES

Figure 1:
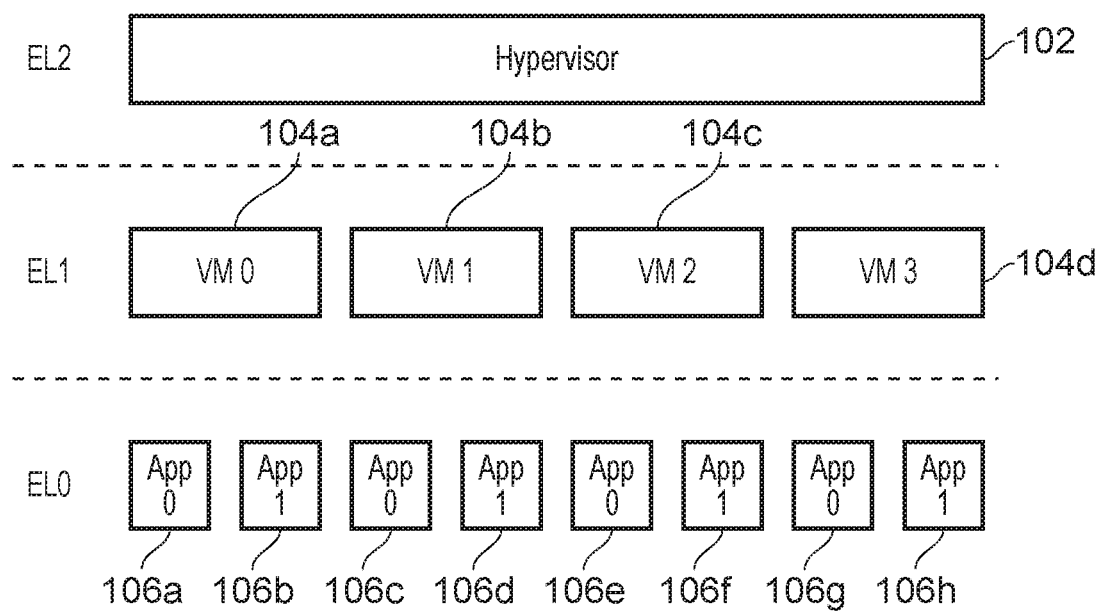
FIG. 1 shows an example of a hierarchy of privilege levels in a data processing system.

In a virtualised system, a virtualised device may receive instructions from a number of software applications being executed by processing circuitry, the processing circuitry being circuitry configured to perform processing operations corresponding to processing instructions, including processing instructions representing the software applications. The multiple software applications may all be executed on the same processing circuitry, or alternatively, they may instead be executed on different sets of processing circuitry (e.g. the processing circuitry may comprise a number of processor cores in a multi-core system). Each software application has a privilege level, which determines a specific set of permissions associated with that application, as well as the level of knowledge that that application has of other software that has access to the virtualised device. Thus, a software application operating at a low privilege level may be unaware of other applications using resources of the virtualised device when issuing instructions to the virtualised device. This raises the possibility of conflicts arising between applications requesting to make use of the virtualised device.

To avoid conflicts, for some types of configuration commands for configuring a virtualised device, a higher-privileged application may mediate requests to be sent to the virtualised device by lower-privileged applications. For example, if a lower-privileged application wishes to send a configuration request to the virtualised device, requesting configuration of the virtualised device according to the requirements of the lower-privileged application, a higher-privileged program may mediate this request to ensure that it is not allowed if it might adversely affect other applications using the virtualised device. Such configuration requests are, in some examples, triggered by the processing circuitry executing a dedicated instruction for triggering the configuration request. However, in other examples, the configuration requests are triggered by the processing circuitry executing a load or store instruction specifying a memory address mapped to a configuration request; for example, writing to a certain memory address could trigger the hardware to issue a configuration request to the virtualised device. Such a request and response may be performed in an application-specific manner using writes to certain addresses or data structures in memory, based on a pre-agreed protocol for interaction between the lower- and higher-privileged software.

One way for such mediation to be carried out is for first (lower-privileged) software to send a request to second (higher-privileged) software to mediate a configuration request that the first software intends to send to the virtualised device. The second software can then return a response to the first software indicating whether or not the first software has permission to send the configuration request and, if permission is given, the first software can then issue its configuration request.

Although this approach does have the benefit of enabling mediation of configuration requests, it has the downside that each software application requires specific drivers to enable it to communicate with the other software applications (with application-specific protocols for the interaction between the applications known at the time of writing the software) as well as having a performance impact. Hence, if a software application is ported onto a different physical platform which is running a different operating system or other higher-privilege code, then this may require a different protocol for requesting mediation from the higher-privilege code, hence increasing development costs for the software developer of the ported application. This approach also introduces costs for both the developer of the higher-privilege code and the developer of the lower-privilege code, in that they both need to interact and agree the protocol by which requests for mediation will be sent from the lower-privilege code to the higher-privilege code, and the corresponding responses sent back from the higher-privilege code.

The present technique provides an alternative approach, in which an interface (also referred to in the examples described below as a management interface) is provided in hardware between the processing circuitry and the virtualised device. The processing circuitry is configured to send a configuration request requesting configuration of the virtualised device from the first software to the interface. The interface receives the request and responds by forwarding a mediated request to the processing circuitry, requesting that the second software (at a higher privilege level) determines a response to the configuration request received from the first software. The mediated request may simply be a request to perform a mediation of the configuration request, or it may comprise the configuration request itself, or it may comprise a modified version of the configuration request. In either case, the mediated request is a request subject to mediation, to trigger the first software to determine a response to the configuration request.

Accordingly, the first and second software do not communicate with one another directly, so they do not need specific drivers or specific protocols agreed in advance to enable mediation to take place. Each of the first and second software only needs to communicate with the interface according to an architecturally-defined configuration command protocol, and so may be compatible with any other software also using the same command architecture supported by the interface hardware. Therefore, there is no need for direct co-operation between the developers of the higher-privilege and lower-privilege code, or to update lower-privilege code when ported to a different physical. In this way, mediation of the configuration request is carried out transparently—from the perspective of the first software, it sends a configuration request to the interface and receives a configuration response; the involvement of the second software is not highlighted to the first software.

In some examples of the present technique, after receiving the mediated request, the second software is configured to process the mediated request, and send a mediated response to the interface in relation to the configuration request. The mediated response indicates the result of the mediation—e.g. whether or not the second software has determined that the configuration request is allowed, or an indication of a result of a software-emulated function of the virtualised device. In response to receiving the mediated response, the interface is arranged to send a configuration response to the processing circuitry based on the mediated response. The configuration response is therefore a response to the configuration request from the first software.

Accordingly, mediation of a configuration request by first (lower-privileged) software is carried out via the interface, avoiding the need for specific drivers for software applications to communicate with one another directly using memory accesses to a shared data structure. This makes the system considerably more versatile.

In some examples, based on the mediated response, the interface is configured to trigger the virtualised device to be configured, as requested by the first software.

Again, this saves processing time by removing the need for the first software to first request mediation via the higher privilege software, and secondly request configuration if the mediation is successful. Instead, the configuration request is sent to the interface directly, and if mediation is successful then the configuration request can be acted upon without needing to issue a second request. Once the interface receives the configuration response from the processing circuitry, providing that the mediated response indicates that the configuration request is allowed, it allows the configuration of the virtualised device to be triggered, based on the configuration request.

The configuration response sent by the interface to the processing circuitry can take a number of forms, dependent in part upon the mediated response from the second software. In some examples, if the mediated response indicates that the configuration request should be rejected, the configuration response sent to the first software comprises an error indication. If an error indication is received from the hardware interface in response to the configuration request, the first software could fall back on other forms of mediation, e.g. by direct interaction with the higher-privilege software, or alternatively may abandon the request to configure the device.

In other examples the mediated response could provide an emulated response to the configuration request, which is generated in software by the second software, rather than the configuration request being directly acted upon by the virtualised device. In this case, the configuration response sent to the first software may be the same as the mediated response provided by the second software. That is, the second software may determine the appropriate response to the configuration request, provide, as the mediated response, the generated response to the configuration request, and this mediated response is forwarded by the interface directly on to the second software without invoking any functionality at the virtualised device. This can be useful for dealing with certain configuration functions which may not be supported by a particular model of virtualised device.

In some examples of the present technique, the processing circuitry restricts the issuing of a mediated response to software applications of a certain threshold privilege level or higher.

This may mean that the processing circuitry ensures that the mediated request is directed specifically towards software with a high enough privilege level (e.g. the mediated request may be raised by triggering an exception which is to be serviced at the threshold privilege level, or by updating data in a mailbox address accessible only to applications at the threshold privilege level or higher), or it may mean that the privilege level of the second software is checked to see if it is high enough, before it is allowed to issue any mediated response (attempts to issue a mediated response causing a fault or being ignored if they are made while in a less privileged state than the threshold privilege level). If the privilege level of the second software is not high enough, the processing circuitry may send an error indication to the interface.

The advantage of this is that only software with a sufficient level of knowledge of the other applications having access to the virtualised device is able to perform the mediation.

In some situations, it may be more efficient not to mediate any configuration requests. Therefore, in some examples, the interface can be set to one of a number of states. For example, these could include a mediation enabled state and a mediation disabled state. In the mediation enabled state, the interface responds to configuration requests by forwarding corresponding requests to the processing circuitry, as described above. On the other hand, in the mediation disabled state, the interface does not forward a mediated request to the processing circuitry when it receives a configuration request. In other words, in the mediation disabled state, the forwarding of mediated requests is suppressed or omitted.

In some examples, the interface could accept configuration requests made when the mediation disabled state is set. This could be useful for scenarios where only one application/user has been configured to use the virtualised device, in which case no mediation may be necessary and any configuration requests made by the single application/user can be accepted as there is no risk of interference with other applications/users. Additionally, if the virtualised device has the capability to mediate requests itself, the mediation disabled state could be set.

In some examples, the interface is arranged to send an error indication to the processing circuitry in response to receiving the configuration request, if the mediation disabled state is set. This could be useful in systems executing legacy code at the higher privilege level which was not written to be compatible with the architecturally-defined mediated request/response commands. In this case, by returning the error indication this can inform the first software at the lower privilege level that mediation was not possible at the architectural level, and the first software could then fall back on other methods of requesting mediation, such as by interaction with the second software through a pre-agreed protocol based on shared data structures in memory for example.

The mediation enabled or mediation disabled state can be identified in the interface in a number of ways; in some examples, the interface includes a register for sorting an enable indicator to indicate whether the mediation enabled state or the mediation disabled state is set.

The enable indicator can take any form, but in some examples may be a single bit—for example, a logic "1" value could indicate a mediation enabled state, while a logic "0" value indicates a mediation disabled state, or vice versa. In any case, storing an enable indicator in a register in the interface is an efficient method for indicating the mediation enabled/disabled state.

Setting of the mediation enabled or mediation disabled state by the processing circuitry may, in some examples, be achieved by the processing circuitry sending a mediation-configure command to the interface.

The mediation-configure command instructs the interface to switch between the mediation enabled and mediation disabled states. This allows software executing on the processing circuitry—for example, the higher-privileged second software—to control whether or not mediation is enabled. For compatibility with legacy code, the default state (in the absence of receiving any mediation-configure commands) could be that the interface is in the mediation disabled state.

In some examples, where the interface includes a register to store an enable indicator, the mediation-configure command triggers the interface to change the value of the enable indicator stored in the register.

For example, if a value of "1" indicates that mediation is enabled, the interface is configured to respond to the mediation-configure command by writing a "0" in place of the "1". This is an efficient and easy-to-implement method of setting the mediation state, which only requires a single command type to be able to switch between the mediation enable/disable states in either direction.

Alternatively, dedicated enable and disable commands could be defined for respectively enabling and disabling mediation at the interface.

In some examples, the processing circuitry is configured to restrict issuing of the mediation-configure command to software of a given privilege level or higher.

This improves the security of the system, by ensuring that only software with a certain set of permissions can change the mediation state of the interface.

In some examples, the mediation enabled state or the mediation disabled state can be separately set for each of a number of different types of configuration command. Then, in response to a given type of configuration command, the interface is configured to determine whether or not to forward the mediated request to the processing circuitry depending on which of the mediation enabled state and the mediation disabled state is set for that given type of configuration command.

Ensuring that the mediation enabled/disabled state is only set for particular types of configuration command improves the efficiency of the system overall, by preventing power and processing time from being wasted by rejecting configuration commands that are of a type for which mediation can be enabled (and vice versa). This approach allows the mediation state to be more tailored to the specific system in which the apparatus is employed. For example, some configuration commands may relate to device-specific functions which could be supported in some models of virtualised device but may be unsupported in other models of virtualised device. A configuration command related to a function directly supported in hardware in the virtualised device could be set to have mediation disabled, while configuration commands relating to functions not supported in hardware in the virtualised device could have mediation enabled so that the corresponding functionality can be emulated in the software of the higher-privilege second software, as a response to the corresponding mediated requests.

In some examples of the present technique, the configuration command is associated with a device context identification value indicative of an associated device context, the associated device context comprising at least one parameter associated with the virtualised device when used by the first software.

In the apparatus of the present technique, there may be many software applications making use of the same virtualised device, with each application having a different set of requirements. Each therefore has its own device context, which specifies one or more parameters for the virtualised device, and which is associated with an identification value. It is useful for the interface to be aware of the source of configuration requests it receives, e.g. for allowing the second software or the interface to manage quality of service criteria which manage fair sharing of resource in the virtualised device between competing applications seeking to use the device. Also, in some examples certain requests from certain software applications may not need to be mediated, so it is helpful for the interface to be able to identify when it has received such a request based on the identity of the first software. Providing a device context identification value can help to enable this.

There are a number of types of configuration request that may be sent from the processing circuitry to the interface, some examples of which are given. It will be understood that these are just some examples of types of configuration command to which the present technique can be applied, and that there may also be many other types that are equally suitable. One example is a request related to power management of resources of the virtualised device.

A software application of a low privilege level (e.g. the first software) may not be aware of any other software using resources of the virtualised device. This means that the first software may believe that it is safe to instruct the device or part of the device to power down when the first software is no longer using it. However, there may be other software applications also using the device that the first software is unaware of, and so powering down the device or part of the device would be detrimental to that other software. It is therefore useful for such power management commands to be mediated by higher privileged software (e.g. the second software) which is aware of all of the software making use of the virtualised device. Thus, it is beneficial to apply the present technique to configuration commands related to power management.

Another example of a type of configuration request to which this technique can be applied is a request which is unsupported in hardware.

Such a request may be a request to configure or use resources which are not present in the virtualised device, or to request that the virtualised device carries out an operation which the virtualised device does not actually support in hardware. In this case, higher-privileged software (e.g. the second software) may emulate the response of the virtualised device to the configuration command. The mediated request might, therefore, also trigger the processing circuitry to execute the second software to emulate the unsupported operation requested to be performed by the virtualised device. By providing an architecturally-defined framework of configuration/mediation commands and responses, and a hardware interface to forward these commands between the first/second software, the software emulation can be made transparent to the first software, so that the first software believes that the configuration is carried out by the virtualised device itself.

A further example of a type of configuration request to which this technique can be applied is a request from an unassigned device context.

When a configuration request from software with an unassigned device context is received by the interface, this may be mediated to determine whether there are any resources available to be assigned to the device context, or whether the unassigned device context needs to wait for resources to be no longer in use by other device contexts. Thus, the present technique is also particularly beneficial in this case.

There are also a number of possible forms the virtualised device can take. These include a hardware accelerator and an input/output device, although it will be understood that many other examples are also possible.

A hardware accelerator is a specialised piece of computer hardware designed for performing specific functions more efficiently than is possible in software running on a general-purpose CPU. Examples of a hardware accelerator include a graphics processing unit (GPU), an artificial intelligence (AI) accelerator, such as a neural processing unit (NPU), or a cryptographic accelerator. Both a hardware accelerator and an input/output device such as, an input port, a network interface, or any other type of input/output device may be shared by many software applications, and so are particularly beneficial situations for applying the present technique.

In some examples, the processing circuitry is configured to send a device action triggering command from the first software to the interface, and the interface is configured to send the device action triggering command to the virtualised device, omitting sending a mediated request to the processing circuitry in response to the device action triggering command.

The device action triggering command is a command for causing the virtualised device to perform specific action, such as processing data. These commands may not need to be mediated once the virtualised device has been configured, so can be sent directly to the virtualised device without being mediated. Thus, processing time is saved by avoiding unnecessary mediation.

For example, where the virtualised device is a GPU or other hardware accelerator, the direct device action triggering command may request processing of data by the hardware accelerator, while the configuration commands may be requests for configuring the share of processing resource available for use by the application issuing the command, requests to change configuration settings for the accelerator, or requests to change the power mode of the accelerator, etc.

In some examples, the virtualised device may not support certain device action triggering commands. When this is the case, the interface may be configured to forward a further mediation request to the second software. The second software can then mediate the device action triggering command, and also emulate the virtualised device, to determine a response to the device action triggering command.

This allows commands that are not supported in hardware to be processed as if they were, improving the versatility of the system.

In some examples, the present technique comprises a computer program for controlling a host data processing apparatus to provide an instruction execution environment according to the apparatus described in any of the above examples. The computer program may be a simulation program comprising processing program logic and interface program logic, to cause the host processing system to perform some of the functions of the processing circuitry (executing software) and the interface (receiving configuration requests from the first software executing on the processing program logic and forwarding mediated requests to the second software executing on the processing program logic). The simulator program may, when executed on the host data processing apparatus, emulate the functionality of these hardware components, so that other applications (designed for execution on a hardware apparatus having these components) executing above the simulation program can continue to operate in the same way, even when executed on a hardware platform not having some or all of those hardware components.

The present technique relates to a system in which a number of processes operate at different privilege levels. Before discussing the specifics of the technique, an overview of the concept of privilege levels is given by way of an example.

FIG. 1 schematically illustrates one example of privilege levels (exception levels) of processes having access to a virtualised device. Operating at privilege level EL2 (Exception Level 2) is a hypervisor 102. The hypervisor 102 may be implemented as a dedicated hardware component or in software, as a series of instructions executed by processing circuitry. The hypervisor 102 manages the execution of virtual machines 104, controlling their access to resources of the virtualised device. Having the highest privilege level, the hypervisor 102 is aware of and has access to all of the virtual machines 104 in execution, allowing it to mediate any commands sent from the virtual machines 104 to a virtualised device.

The virtual machines 104 operate at the next privilege level down, EL1. Each virtual machine 104 is unaware of the operations of the other virtual machines, since they all operate at the same exception level; this means that it is possible that one of the virtual machines 104 may unknowingly issue a configuration request to the virtualised device that would be detrimental to one or more of the other virtual machines 104. Hence, it can be useful for some configuration requests from the virtual machines 104 to be mediated by the hypervisor 102.

A number of applications 106 are executed within each virtual machine 104, the applications 106 being executed at the lowest privilege level, EL0. Each virtual machine 104 has control over the applications 106 running within its guest operating system—for example, VM0 104a has control over the first two applications 106a, 106b shown—but does not have any control over the applications 106 running on the other virtual machines 104.

Each privilege level, therefore, defines the level of control a process has over the other processes running on the virtualised device—the processes executing at EL2 have control over those executing at EL1 and EL0, and the processes executing at EL1 have control over those executing at EL0. Furthermore, each privilege level is linked with a specific set of access permissions, with higher-privileged processes having greater access than lower-privileged process. It will be appreciated that some architectures may define more than 3 privilege levels. For example, a secure monitor executing at a privilege level EL3 higher than the hypervisor privilege level EL2 could control transitions between secure and non-secure domains of operation. It will be appreciated that this is just one example of a possible hierarchy of privilege levels, and other implementations may use a different set of privilege levels, but in general the processing system supports execution of software processes with different privilege levels, where a more privileged process has rights to do some actions or access some data that are not allowed for a less privileged process.

Figure 2:
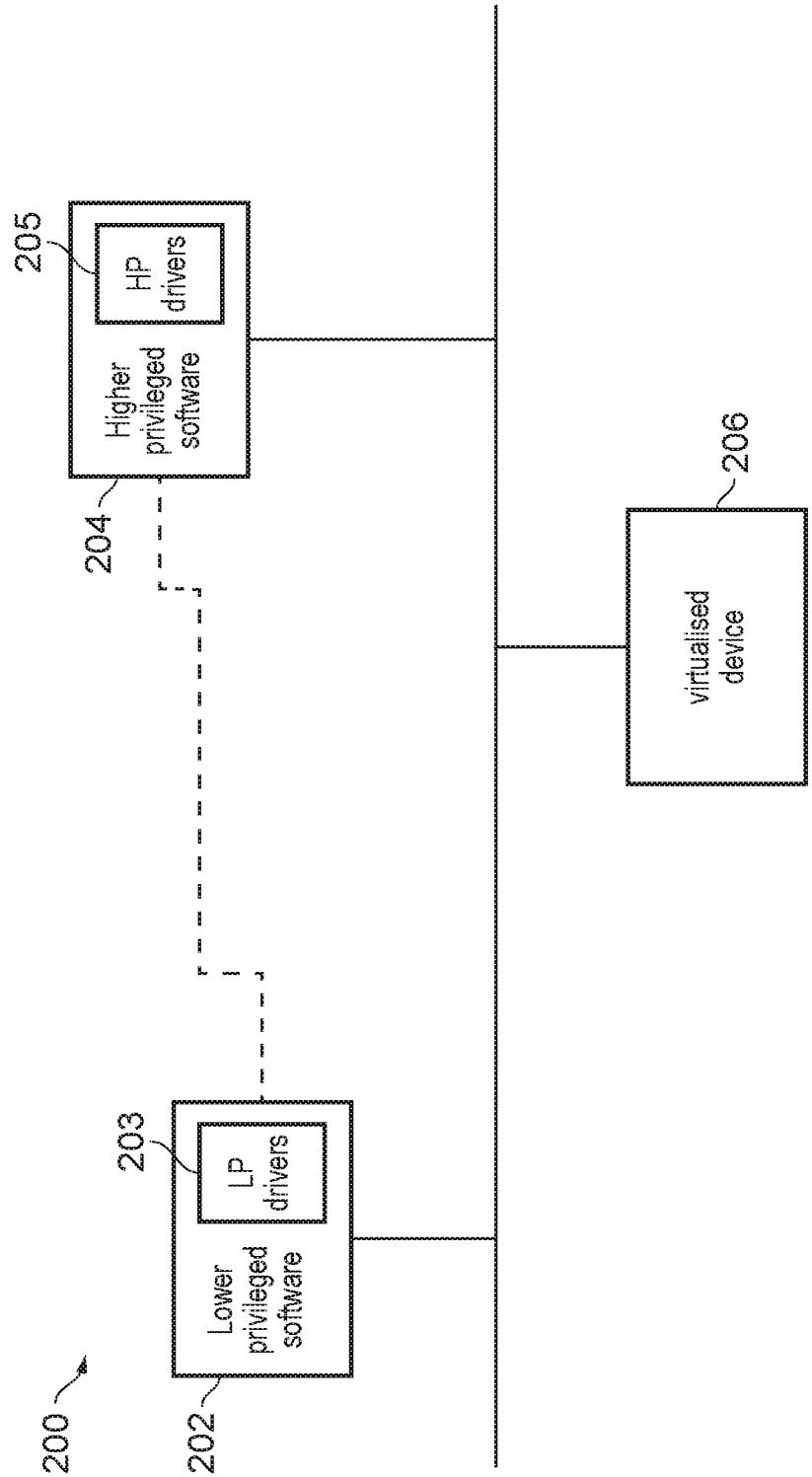
FIG. 2 shows an example of an approach to mediation of configuration requests.

FIG. 2 shows an example of a system 200 with multiple privilege levels, such as those shown in FIG. 1. In FIG. 2, two software processes 202, 204 have access to a virtualised device 206. The software 202, 204 is executed on processing circuitry (not shown), which can be either the same processing circuitry executing both software processes 202, 204, or separate sets of processing circuitry. The virtualised device 206 is a hardware component capable of executing operations under the control of the software processes 202, 204. For example, the virtualised device 206 could be an input/output device, or a hardware accelerator configured to perform specific functions more efficiently than is possible in software running on a generic CPU, such as a dedicated graphics processing unit (GPU), an AI accelerator or neural processing unit (NPU) for use in artificial intelligence applications, or a cryptographic accelerator for performing cryptographic operations.

Each of the software processes 202, 204 has an assigned privilege level, with one being higher-privileged software 204 and the other being lower-privileged software 202. For example, the lower-privileged software 202 could be a virtual machine 104 such as those shown in FIG. 1, and the higher-privileged software 204 could be a hypervisor 102 or a specific set of instructions executing within the hypervisor 102. Each of the higher- and lower-privileged software 202, 204 may wish to send a request to configure the virtualised device 206 to receive data processing instructions from that software. Since it has a lower privilege level, configuration requests from the lower-privileged software 202 need to be mediated by the higher-privileged software 204.

In the arrangement shown in FIG. 2, mediation takes place by communication between the lower-privileged software 202 and the higher-privileged software 204. The lower-privileged software 202 sends a mediated request to the higher-privileged software 204, in response to which the higher-privileged software 204 determines—based on its knowledge of any other software having access to resources on the virtualised device 206—whether the configuration request from the lower-privileged software 202 should be allowed or rejected. The higher-privileged software 204 then returns a mediated response to the lower-privileged software 202 indicating whether or not the configuration request is allowed; if the request is allowed the lower-privileged software 202 then sends the configuration request to the virtualised device 206.

The configuration requests and responses as described above could, for example, involve writes to data structures in memory according to some agreed application-specific protocol. Such writes would require the co-operation of the software developers of both the higher-privileged software 204 and the lower-privileged software 202, in a manner which is bespoke for the particular application. Thus, if multiple lower-privileged software applications attempt to interact with the same device, the developer of the higher-privileged software 204 may agree different data structures and protocols for interacting with each item of lower-privileged software.

Requiring mediation of configuration commands from lower-privileged software 202, as shown in FIG. 2, has numerous advantages; for example, mediation reduces the likelihood of problems caused by contention for resources on the virtualised device 206 and improves the security of the system 200. However, there are also significant downsides to this particular approach in terms of the efficiency and versatility of the system. One downside, for example, is the need for each configuration request from the lower-privileged software 202 to be mediated in advance of being sent to the virtualised device 206. This adds to the processing time taken for the request to reach the virtualised device, reducing the efficiency of the system 200. Another downside comes from the fact that the two software processes 202, 204 are required to communicate directly, in order for the mediation to be carried out. This requires each software process 202, 204 to have specific drivers 203, 205 to enable communication with the other software process. These software drivers 203, 205 need to be updated or reinstalled each time a software process is replaced, meaning that the versatility of the system 200 is limited. This is particularly a problem in modern systems, where multiple users may share access to a single server, with users switching from one server to another as prices and other circumstances change. It would therefore be beneficial to improve the efficiency and versatility of the system 200.

Figure 3:
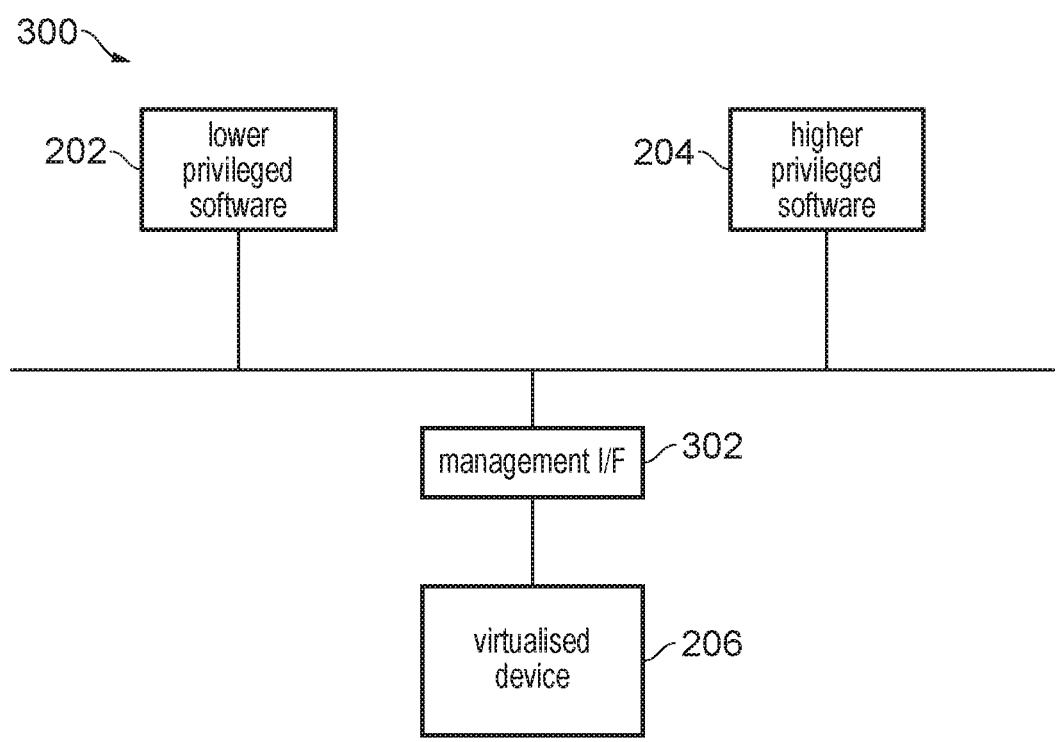
FIG. 3 shows an alternative approach to mediation of configuration requests, according to examples of the present technique.

FIG. 3 shows a system 300 employing an example of the present technique. In the system shown in FIG. 3, a management interface 302 is provided between the software 202, 204 and the virtualised device 206. In this arrangement, the lower-privileged software 202 is configured to send a configuration request to the management interface 302 without first requesting mediation by the higher-privileged software 204. The management interface 302 then assumes the responsibility for sending a mediated request to the higher-privileged software 204 in respect of the configuration request. The mediation of the configuration request is carried out by the higher-privileged software 204, but the mediated response is returned to the management interface 302 instead of to the lower-privileged software 202. If the mediated response indicates that the configuration request is to be accepted, the management interface 302 then sends a configuration response indicating this to the lower-privileged software 202, and triggers the virtualised device 206 to be configured according to the configuration request. On the other hand, if the mediated response indicates that the configuration request is to be rejected, the management interface 302 sends a configuration response to the lower-privileged software 202 to indicate this—for example in the form of an error indication.

In the example above, the mediated response indicates whether or not the configuration request can be accepted or rejected.

However, in other examples, the mediated response could comprise an emulated response to the configuration request, which may be sent to the interface 302 and then forwarded on to the first software 202 without any need for action at the virtualised device 206. For example, this can be useful in handling certain configuration actions which are not actually supported in hardware by a particular model of virtualised device.

The configuration requests and configuration responses and the mediated requests and mediated responses may be defined architecturally, such that a hardware device compliant with a certain architecture guarantees that software designed according to the architecture will behave in a predictable way. As a result, the higher- and lower-privileged software 204, 202 can be designed to use the configuration and mediation requests and responses in the manner described above, without needing to agree on a mediation protocol with other software (the agreement on the protocol is effectively between each software provider individually and the hardware provider or standard, rather than between two software providers, which is more efficient for software development).

This is an example of transparent mediation of a configuration request, in which the mediation of the configuration request is hidden from the lower-privileged software 202, such that, from the perspective of the lower-privileged software 202, a configuration request is sent to the management interface 302 (it is even possible for the lower-privileged software 202 to be programmed as if it is sending the configuration request directly to the virtualised device 206), and a response is then received from the management interface 302. The mediation is therefore carried out without any involvement of the lower-privileged software 202, and without the lower-privileged software 202 needing to be aware of the involvement of the higher-privileged software 204.

In this arrangement, since the mediated request is sent by the management interface 302, rather than by the lower-privileged software 202, specialised drivers 203 for communicating with the higher-privileged software 204 do not need to be provided within the lower-privileged software 202, and nor do specialised drivers 205 for communicating with the lower-privileged software 202 need to be provided in the higher-privileged software 204. This improves the versatility of the system 300, allowing either software program 202, 204 to be replaced without the need to update or reinstall the drivers 203, 205 in the other software. Furthermore, this arrangement enables the lower-privileged software 202 to send a configuration request directly to the management interface 302, without waiting for the higher-privileged software 204 to mediate the request first. Thus, the processing time required to send the configuration request is reduced, improving the overall efficiency.

The arrangement shown in FIG. 3 may also have uses beyond the mediation of configuration requests. For example, while most device action triggering commands (described in more detail with reference to FIGS. 13 to 15) do not need to be mediated, device action triggering commands which are not supported by the virtualised device 206 could be mediated, and this can be carried out according to the above technique.

Furthermore, the mechanism described above is not just useful for mediation of requests, but could also be used to enable any other communication between the first and second software. This allows any communication between the software applications to take place without the need for specialised drivers.

Figure 4:
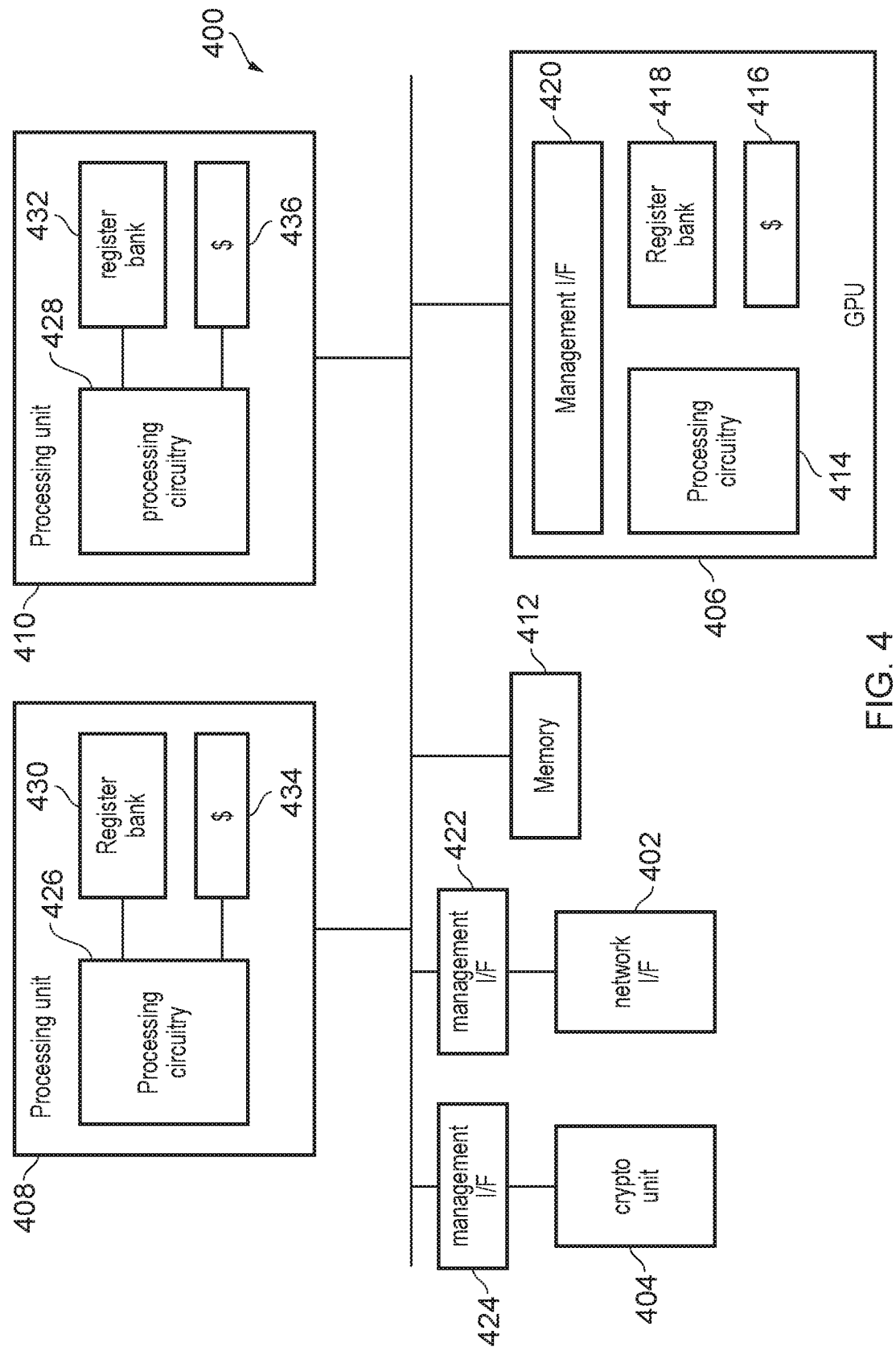
FIG. 4 shows an example configuration of processing circuitry and hardware devices.

FIG. 4 shows a more detailed example of a hardware system 400 in which the present technique can be applied.

In FIG. 4, a number of examples of virtualised devices are shown, including a network interface 402, a cryptographic unit 404, and a graphics processing unit (GPU) 406. Each of the virtualised devices 402, 404, 406 is an example of the virtualised device 206 shown in FIG. 3, and is accessible to one or more of a number of processing units 408, 410, and all of the processing units 408, 410 and the virtualised devices 402, 404, 406 have access to shared memory 412. The GPU 406 comprises a number of components, including processing circuitry 414 for executing operations under the control of one of more software applications executing on the processing units 408, 410. The processing circuitry has access to a cache 416, for storing data or instructions retrieved from memory 412, and a register bank 418. Also provided within the GPU 406 is a management interface 420. The management interface 420 performs the same functions as the management interface 302 in FIG. 3—it is configured to receive configuration requests from and send mediated requests to the processing units 408, 410. In this example, the management interface 420 is shown as a component of the GPU 406, however it is also possible for the management interface 420 to be a separate component to the virtualised device, as shown by the management interfaces 422, 424 provided for each of the network interface 402 and the cryptographic unit 404. The management interface 420 also has access to the register bank 418.

Each of the processing units 408, 410 includes processing circuitry 426, 428 configured to execute operations to process instructions. The instructions processed by the processing circuitry 426, 428 may represent one or more software applications such as the software applications 202, 204 depicted in FIG. 3, each having a set privilege level. The processing circuitry 426 has access to a register bank 430, 432 and a cache 434, 436, the cache 434, 436 being configured to store data or instructions retrieved from memory 412.

When first software executing on the processing circuitry 426 of one of the processing units 408 requests configuration of one of the virtualised devices, for example the GPU 406, the processing circuitry 426 is arranged to send a configuration request to the management interface 420 associated with the GPU 406. The management interface responds to the configuration request by forwarding a mediated request to processing circuitry executing second, higher-privileged software, where this might be the same processing circuitry 426 executing the first software or different processing circuitry 428. The processing circuitry 426, 428 receiving the mediated request is then configured to mediate the configuration request and send a mediated response to the management interface 420, which is arranged to send a configuration response to the processing circuitry 426 executing the first software, and to optionally trigger configuration of the GPU based on the configuration request.

Figure 5:
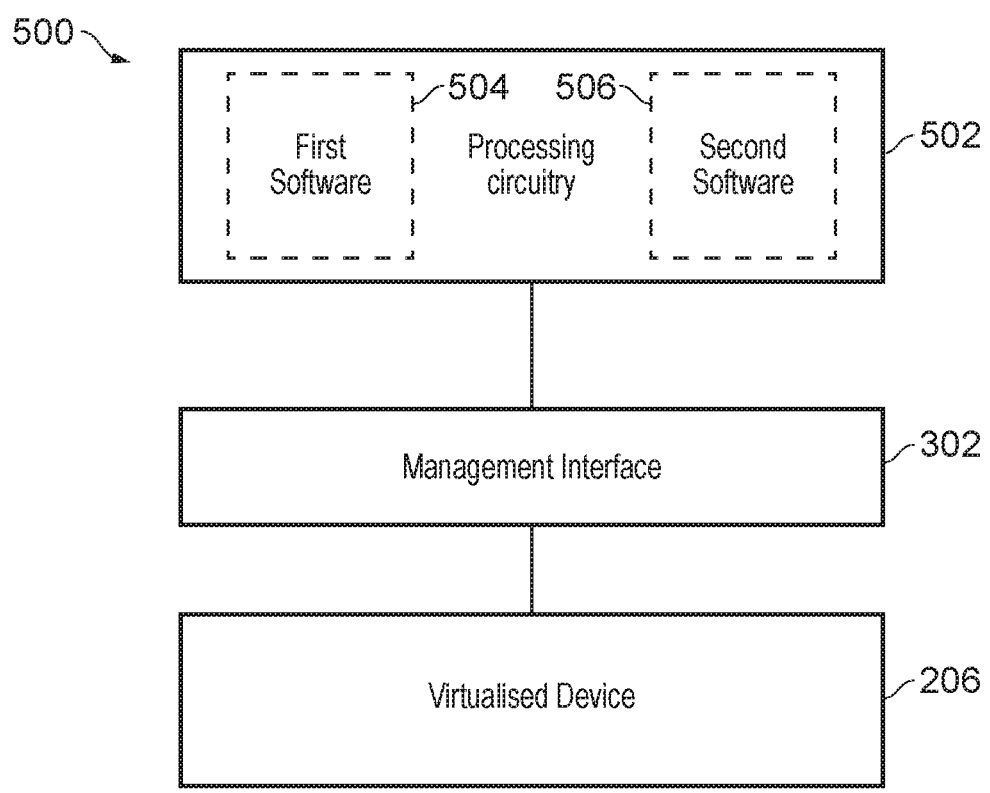
FIG. 5 shows an example of a data processing system.

FIG. 5 shows a generalised overview of a system 500 according to an example of the present technique. The system includes a virtualised device 206 and processing circuitry 502 in communication via a management interface 302. First software 504 and second software 506 with different privilege levels are executed on the processing software 502, the first and second software 504, 506 being examples of the lower- and higher-privileged software 202, 204 shown in FIG. 3. The second software 506 has a higher privilege level than the first software 504, so when the first software 504 sends a configuration request to the management interface 302, a mediated request is sent from the management interface 302 to the second software 506. The management interface 302 receives a mediated response from the second software 506, and sends an appropriate configuration response back to the first software 504. If the mediation indicates that the configuration request is allowed, the management interface 302 also triggers the virtualised device 206 to be configured in accordance with the configuration request.

In this example, the first and second software 504, 506 are shown executing on the same processing circuitry 502; however, it will be understood that this is just one possible configuration, and the first and second software 504, 506 could also be executing on separate sets of processing circuitry.

Figure 6:
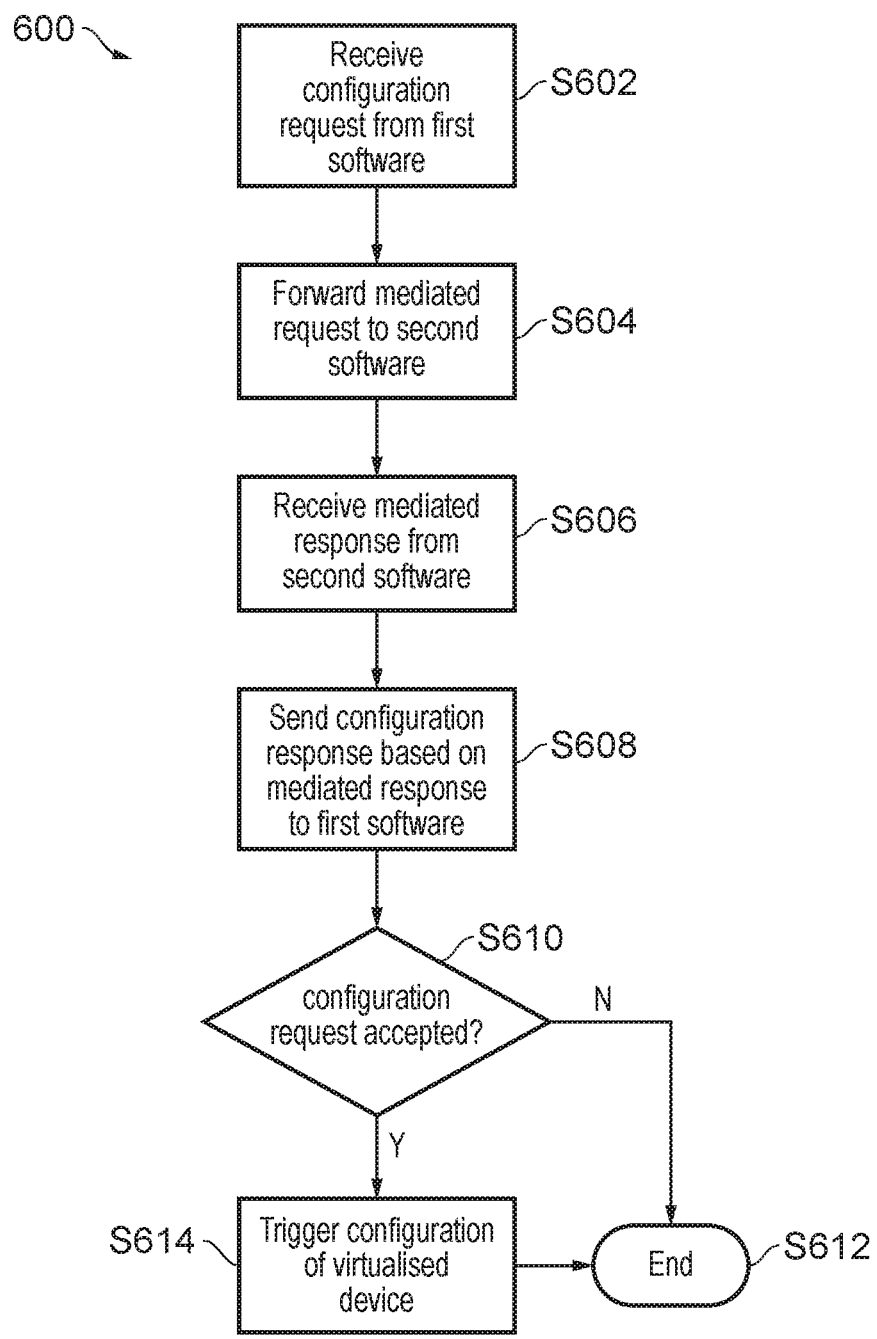
FIG. 6 is a flow diagram illustrating an example of a method of operation of a management interface.

FIG. 6 is a flow diagram showing an example of a method 600 carried out by a management interface (such as the management interfaces 302, 420, 422, 424 shown in FIGS. 3-5) according to an example of the present technique.

In a first step S602, the management interface is configured to receive a configuration request from processing circuitry 426, 428, 502 executing first software 202, 504. The configuration request is a request to configure a virtualised device associated with the management interface. In response to receiving the configuration request, the management interface then forwards S604 a mediated request to processing circuitry executing second software 204, 506. The mediated request is a request to mediate the configuration request from the first software. Next, in response to sending the mediated request, the management interface is configured to receive S606 a mediated response from the second software, indicating whether or not the configuration request is allowed. The management interface then sends S608 a configuration response to the processing circuitry executing the first software, indicating whether or not the configuration request is accepted. Finally, following a determination S610 of whether or not the configuration request is accepted, the process either ends S612 without configuration of the virtualised device (if the configuration request was not accepted) or ends after triggering S614 the configuration of the virtualised device in accordance with the configuration request.

Figure 7:
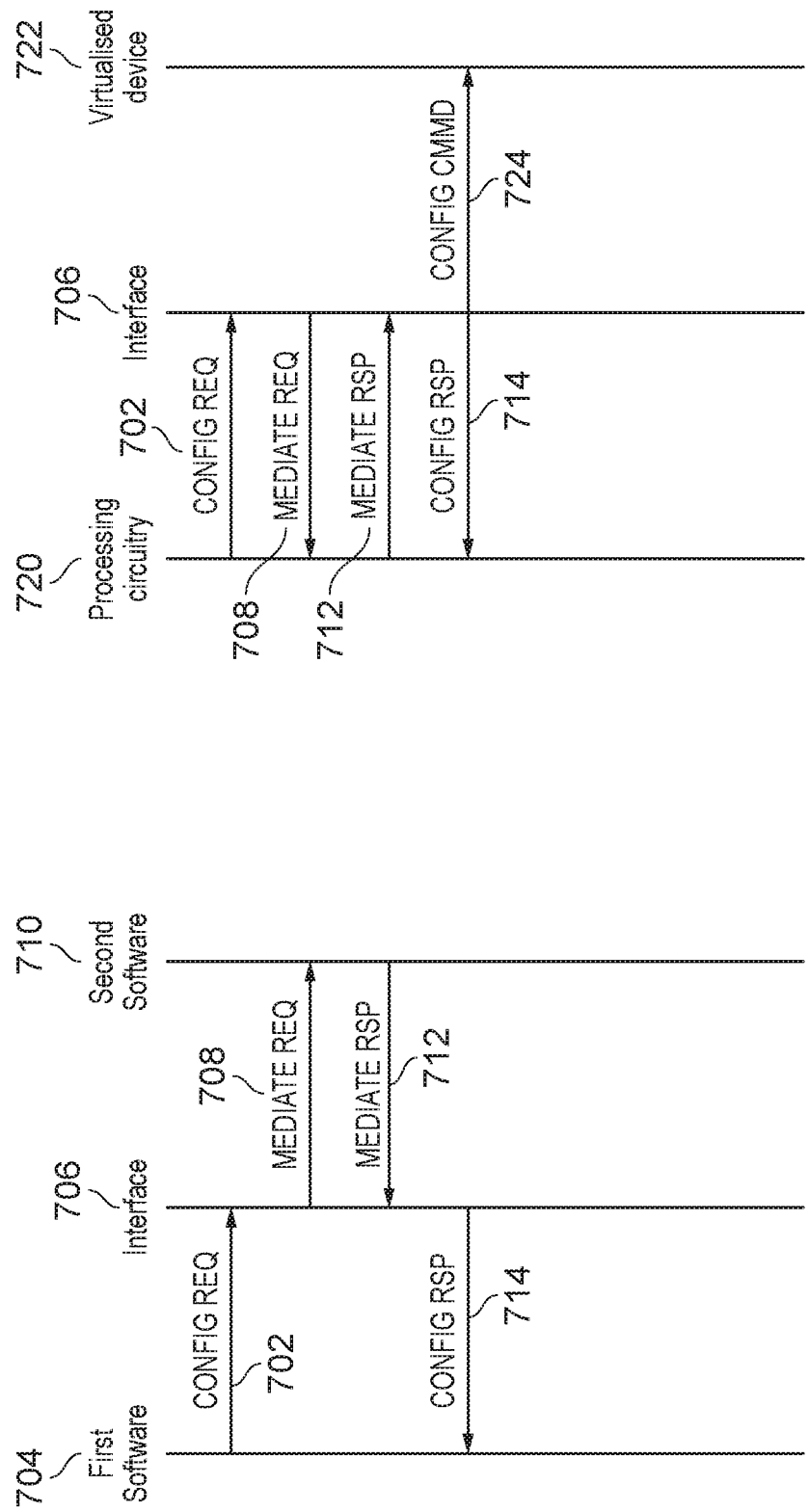
FIGS. 7A and 7B are timing diagrams illustrating examples of signals transferred between parts of a data processing system.

FIGS. 7A and 7B are timing diagrams illustrating some of the signals passing between components of a system 300, 400, 500 according to the present technique. In FIG. 7A, a configuration request 702 is first sent from the first software 704 to the interface 706. A mediated request 708 is then sent from the interface to the second software 710, followed by a mediated response 712 being sent from the second software 710 to the interface 706. Then, a configuration response 714 is sent from the interface to the first software. This demonstrates the invisibility to the first software 704 of the mediation of the configuration request by the second software 710. Focussing on the signals sent and received by the first software, it only sees a configuration response 714 being received in response to a configuration request 702. Since there is no direct communication between the first software 704 and the second software 710, no specialised drivers or protocol for communication with the second software are needed. The first software 704 is an example of the lower-privileged software 202, 504 shown in FIGS. 3 and 5, the second software 710 is an example of the higher-privileged software 204, 502 shown in FIGS. 3 and 5, and the interface 706 is an example of the management interface 302, 420, 422, 424 shown in FIGS. 3-5.

FIG. 7B, meanwhile, shows signals passed between processing circuitry 720 executing the first and second software, the interface 706 and a virtualised device 722, where the processing circuitry 720 is an example of the processing circuitry 426, 428, 502 shown in FIGS. 4 and 5, and the virtualised device 722 is an example of the virtualised devices 206, 402, 404, 406 shown in FIGS. 3-5. In FIG. 7B, a configuration request 702 is sent from the processing circuitry 720 to the interface 706, which responds by sending a mediated request 708 to the processing circuitry 720, requesting mediation of the configuration request 702 by higher-privileged software. A mediated response 712 is then sent by the processing circuitry 720 to the interface 706, which then returns a configuration response 714 to the processing circuitry 720. At the same time as sending the configuration response 714 to the processing circuitry, the interface 706 sends a configuration command 724 to the virtualised device 722 based on the configuration request 702, the configuration command 724 triggering the virtualised device 722 to be configured according to the configuration request 702. It should be noted that, although the configuration command 724 and the configuration response 714 are shown in FIG. 7B as occurring coincidentally, it is also possible for them to take place at slightly different times, as long as neither happens before the mediated response 712 is received from the interface.

In some examples of the present technique, a mediation enabled state or a mediation disabled state can be set. In the mediation enabled state, mediation of configuration requests according to the techniques described so far is facilitated; in the mediation disabled state, mediation of configuration requests is not carried out. This is useful in situations where the result of mediation of configuration requests is likely to always be the same; for example, if the first software is the only software accessing certain resources on the virtualised device, configuration requests are likely to always be allowed. Conversely, if all of the resources are currently in use by more privileged software than the first software, or if there is some fault, configuration requests are likely to always be rejected. In either case, there is no need for configuration requests to be mediated, since the result of the mediation is always the same; thus, it is beneficial to switch to the mediation disabled state to save processing time and power, by preventing unnecessary mediation from taking place. In other cases, however, mediation is still necessary, so the mediation enabled state should be set.

Figure 8:
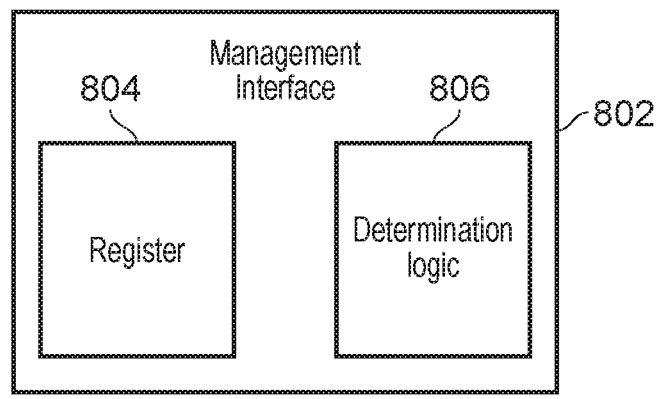
FIG. 8 shows an example of a management interface.

The mediation enabled or disabled state can be set in the management interface in a number of ways. FIG. 8 shows an example of a management interface 802 according to the present technique, which includes a register 804, the management interface 802 being an example of the management interfaces 302, 420, 422, 424, 706 in FIGS. 3-5, 7A and 7B. The register 804 includes an entry storing an enable indicator indicative of whether the mediation enabled state or the mediation disabled state is set. The enable indicator may be in the form of a single bit (for example, a logic "1" value could indicate the mediation enabled state while a logic "0" value indicates the mediation disabled state, or vice versa), or in any other form. The mediation enabled or disabled state is set by changing the enable indicator in the register, for example in response to a mediation-configure command from processing circuitry.

The register 804 may be provided within the management interface 802 as shown in FIG. 8, or it may be a register in a register bank in the virtualised device, such as the register bank 418 in the GPU 406 of FIG. 4.

The management interface 802 shown in FIG. 8 also includes determination logic 806, configured to determine, in response to a configuration request from processing circuitry executing the first software, whether the to send a mediated request to the processing circuitry executing the second software, based on the enable indicator set in the register 804.

Figure 9:
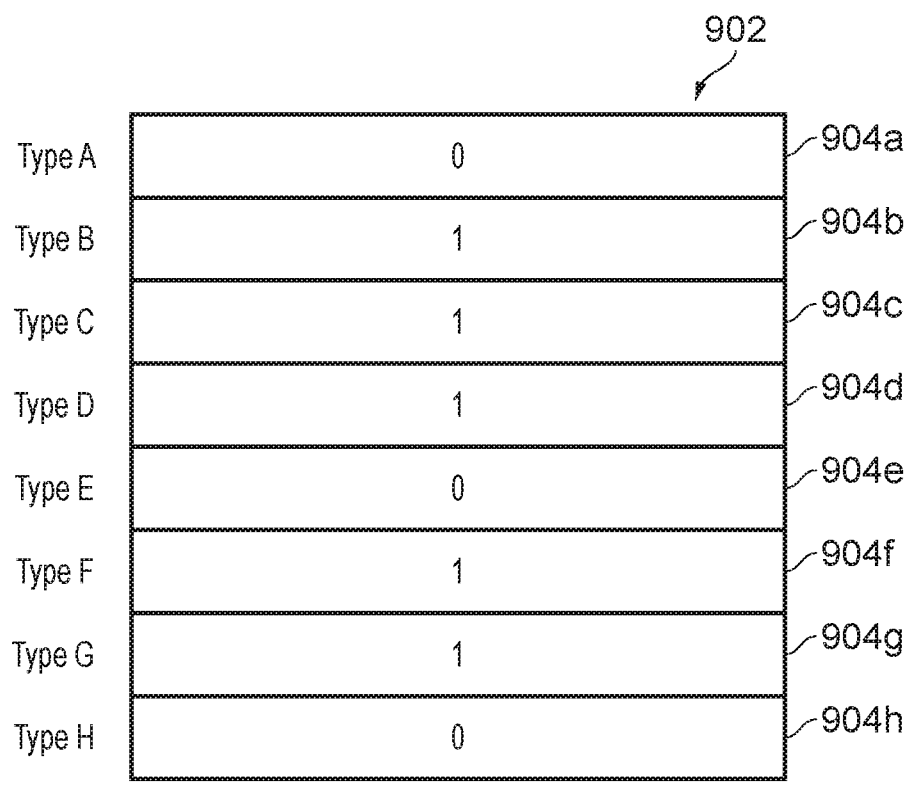
FIG. 9 shows an example of a register for use with a management interface.

In some examples, rather than setting the mediation enabled state or the mediation disabled state for all configuration requests received by the management interface, the state can be set individually for each of a number of different types of configuration command. FIG. 9 shows an example of a register 902 in which this could be implemented. Register 902 has 8 entries 904, each for a different type of configuration request. Each entry stores an enable indicator, which indicates whether the mediation enabled state or the mediation disabled state is set for the corresponding type of configuration command. In this example, each enabled indicator is a single-bit value, with a "1" representing the mediation enabled state for that type of configuration request and a "0" representing the mediation disabled state for that type of configuration request. For example, the enable indicators in the entries 904*b-d*, 904*f-g* for configuration request types B-D and F-G are "1"s, identifying that the mediation enable state is set for each of these types. This means that, when a configuration request of one of those types is received by the management interface, a mediated request is forwarded to the processing circuitry in accordance with the examples described above. On the other hand, the enable indicators in the entries 904*a*, 904*e*, 904*h* for configuration request types A, E and H are set to "0"s, identifying that the mediation disabled state is set for these types. This means that when a configuration request of one of these types is received by the management interface, a mediated request is not forwarded to the processing circuitry.

While the register 902 depicted in FIG. 9 only shows eight entries 904 for eight types of configuration request, it will be understood that any number of entries 904 could be included. The types of configuration request referred to may include, for example, configuration requests related to power management of resources on the virtualised device, configuration requests that are unsupported in hardware, and configuration requests from an unassigned device context. However, these are just some examples of types of configuration requests; other types of configuration request are also possible. Furthermore, the register 902 is just one example of the register 804 shown in FIG. 8. Also, in some cases multiple types of requests could share a single indicator 904 so that each of those types is enabled/disabled simultaneously by the setting of the shared indicator, while other types may have a separate enable/disable indicator 904.

Figure 10:
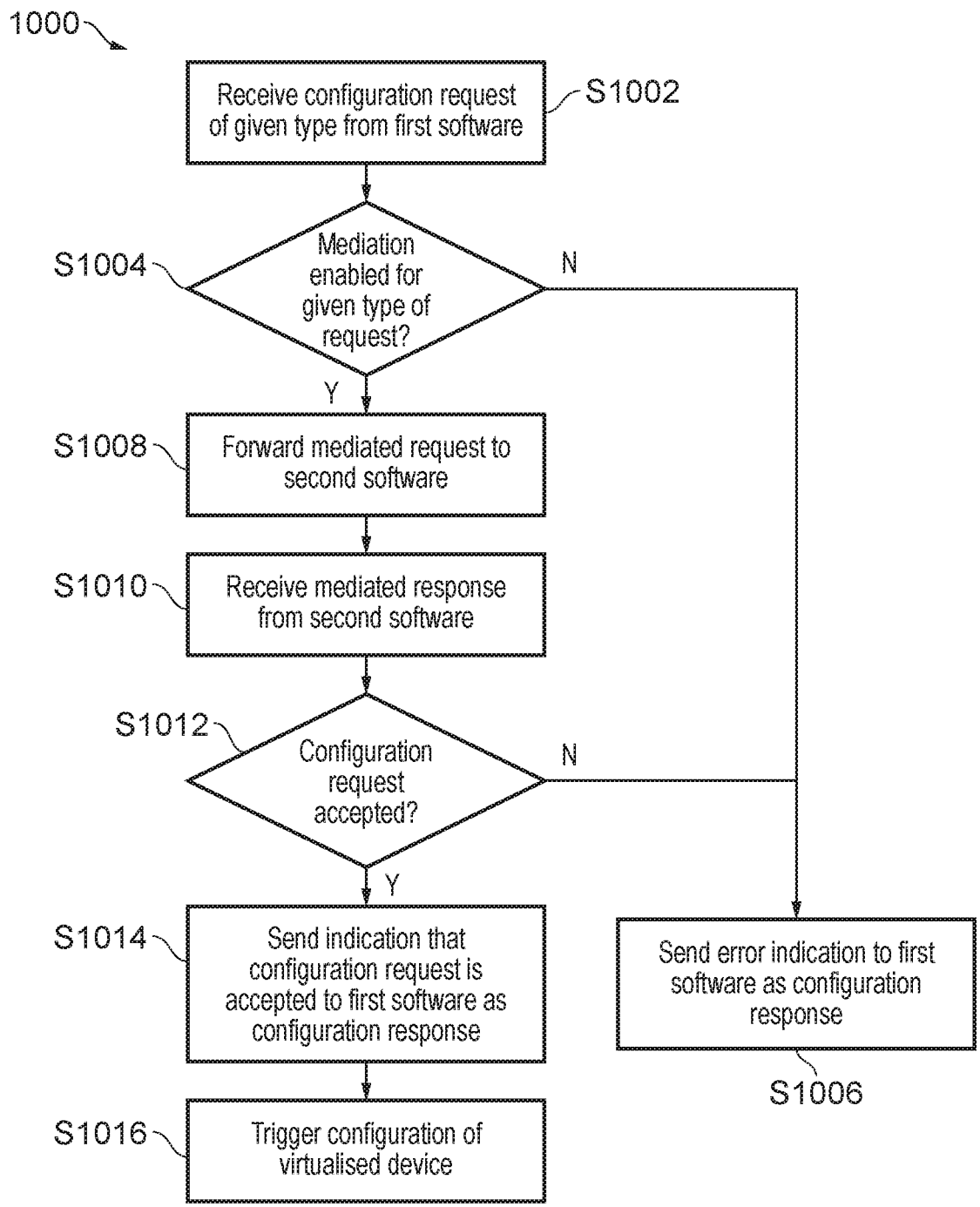
FIG. 10 is a flow diagram illustrating an example of a method of operation of a management interface.

FIG. 10 is a flow diagram showing an example of a method 1000 carried out by a management interface in accordance with examples of the present technique. The method begins with a step S1002 of receiving a configuration request of a given type from processing circuitry executing first software. Next, a determination S1004 is made—for example by the determination logic 806 shown in FIG. 8—as to whether or not mediation is enabled for the given type of configuration request. For example, this could involve the determination logic 806 reading the enable indicator 906 stored in the entry 904 of the register 902 corresponding to that type of configuration request. If it is determined that mediation is disabled for the given type of configuration request, the method moves to a step S1006 of sending an error indication to the processing circuitry executing the first software as the configuration response. This indicates to the first software that the configuration request has been rejected. The first software can then fall back on other ways of making forward progress, e.g. by emulating the functionality of the virtualised device itself in software.

On the other hand, if it is determined that mediation is enabled for the given type of configuration request, the method moves to a step S1008 of forwarding a mediated request to processing circuitry executing second software, the second software having a higher privilege level than the first software. In response to the mediated request, a mediated response is received S1010 from the processing circuitry executing the second software, indicating whether the configuration request is accepted or rejected. A determination S1012 is then made—for example by the determination logic 806—as to whether or not the mediated response indicates that the configuration request has been accepted. If it is determined that the configuration request has been rejected, an error indication is sent S1006 to the processing circuitry executing the first software as the configuration response. On the other hand, if the configuration request is accepted, the method moves to a step S1014 of sending an indication to the processing circuitry executing the first software that the configuration request is accepted, the indication forming the configuration request. Then, based on the configuration request, the interface triggers S1016 configuration of the virtualised device.

Figure 11:
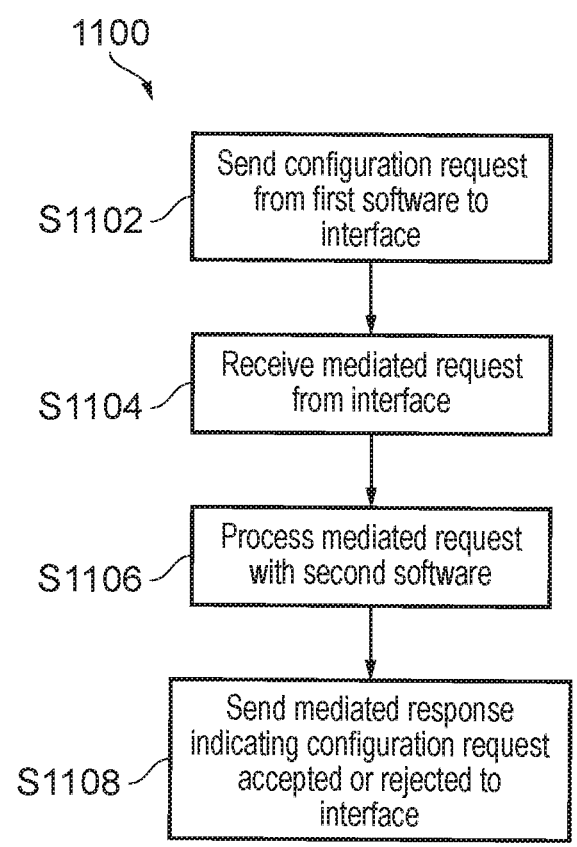
FIG. 11 is a flow diagram illustrating an example of a method of operation of processing circuitry.

FIG. 11 shows an example of a method 1100 carried out by processing circuitry, according to examples of the present technique. The method begins with a step S1102 of sending a configuration request from first software executing on the processing circuitry to the interface. In response to this, a mediated request is then received S1104 from the interface. The mediated request is then processed S1106 by second software executing on the processing circuitry, the second software having a higher privilege level than the first software, and the mediated request being processed by mediating the configuration request. Once the mediation is complete, the method then moves to a final step S1108 of sending a mediated response to the interface, the mediated response indicating whether the configuration request is accepted or rejected.

Figure 12A:
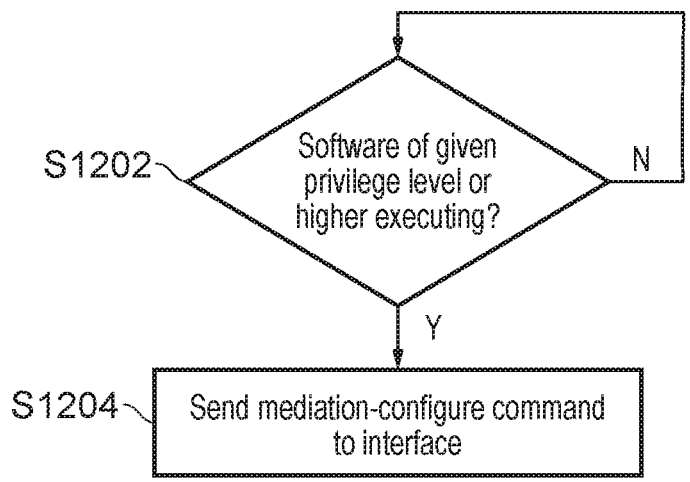
FIGS. 12A and 12B are flow diagrams showing methods involved in setting a mediation enabled state or a mediation disabled state.
Figure 12B:
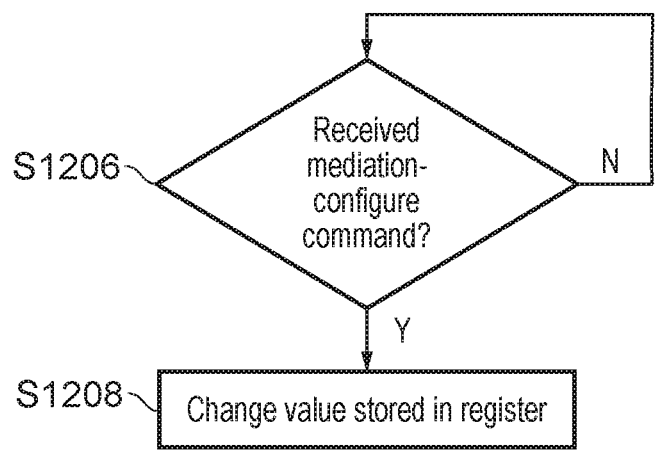

FIGS. 12A and 12B are flow diagrams showing methods involved in setting the mediation enabled state or mediation disabled state, performed by processing circuitry and an interface respectively.

FIG. 12A shows that a mediation-configure command is sent S1204 by the processing circuitry to the interface when it is determined S1202 that software of a given privilege level or higher is operating. This is to ensure that the security of the system is maintained.

FIG. 12B shows that when S1206 a mediation-configure command is received by the interface, the enable indicator stored in the register is changed S1208.

Figure 13:
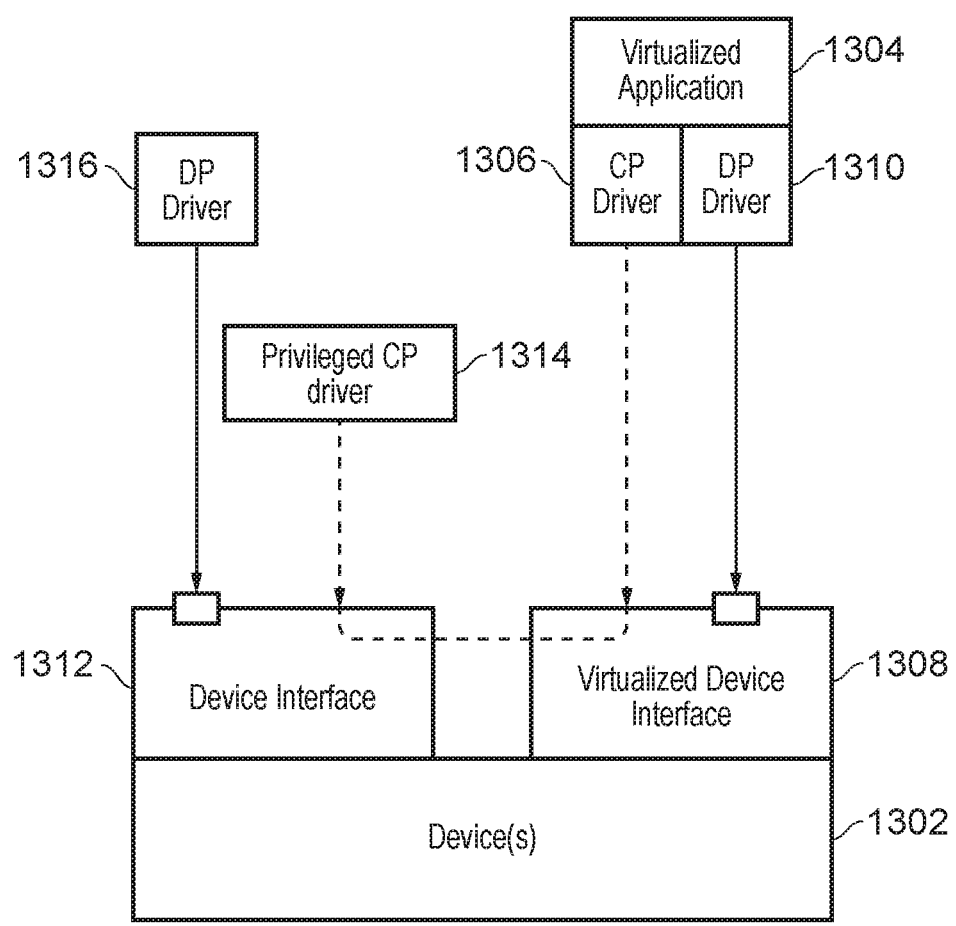
FIGS. 13 to 15 show examples of using a data processing system.

FIG. 13 schematically represents an example of the present technique. The figure shows one or more devices 1302, each capable of operating as a virtualised device under the control of a virtualised application 1304. The virtualised application 1304 (an example of the first, lower-privileged software 202, 504, 704 described in earlier examples) has a CP (control path) driver 1306 configured to send control information, such as configuration requests, to the devices 1302 via a virtualised device interface 1308, and a DP (data path) driver 1310, configured to send commands (device action triggering commands) to the devices 1302 for triggering specific processing operations to run on the device 1302.

When a configuration request is sent from the virtualised application 1304, via the CP driver 1306, to the virtualised device interface 1308, the interface 1308 responds by forwarding a mediated request via a device interface 1312 to a privileged CP driver 1314. The privileged CP driver 1314 returns a mediated response to the virtualised device interface 1308 via the device interface 1312, and the virtualised device interface 1308 then sends a corresponding configuration response to the virtualised application 1304 via the CP driver 1306. The virtualised device interface 1308 is an example of a management interface 302, 420, 422, 424, 706, 802 as shown in the earlier examples.

Device action triggering commands sent via the DP driver 1310 of the virtualised application or by other DP drivers 1316 associated with the devices 1302 do not usually need to be mediated, so are passed on to the devices 1302 by the virtualised device interface 1308 and the device interface 1312 respectively. However, in some cases they do need to be mediated. For example, if a device action triggering command is not supported in the hardware of the virtualised device, the device interface 1312 may be configured to forward a further mediation request to the second software executing on the processing circuitry. The second software can then mediate the device action triggering command, and also emulate the response of the virtualised device to the device action triggering command.

Figure 14:
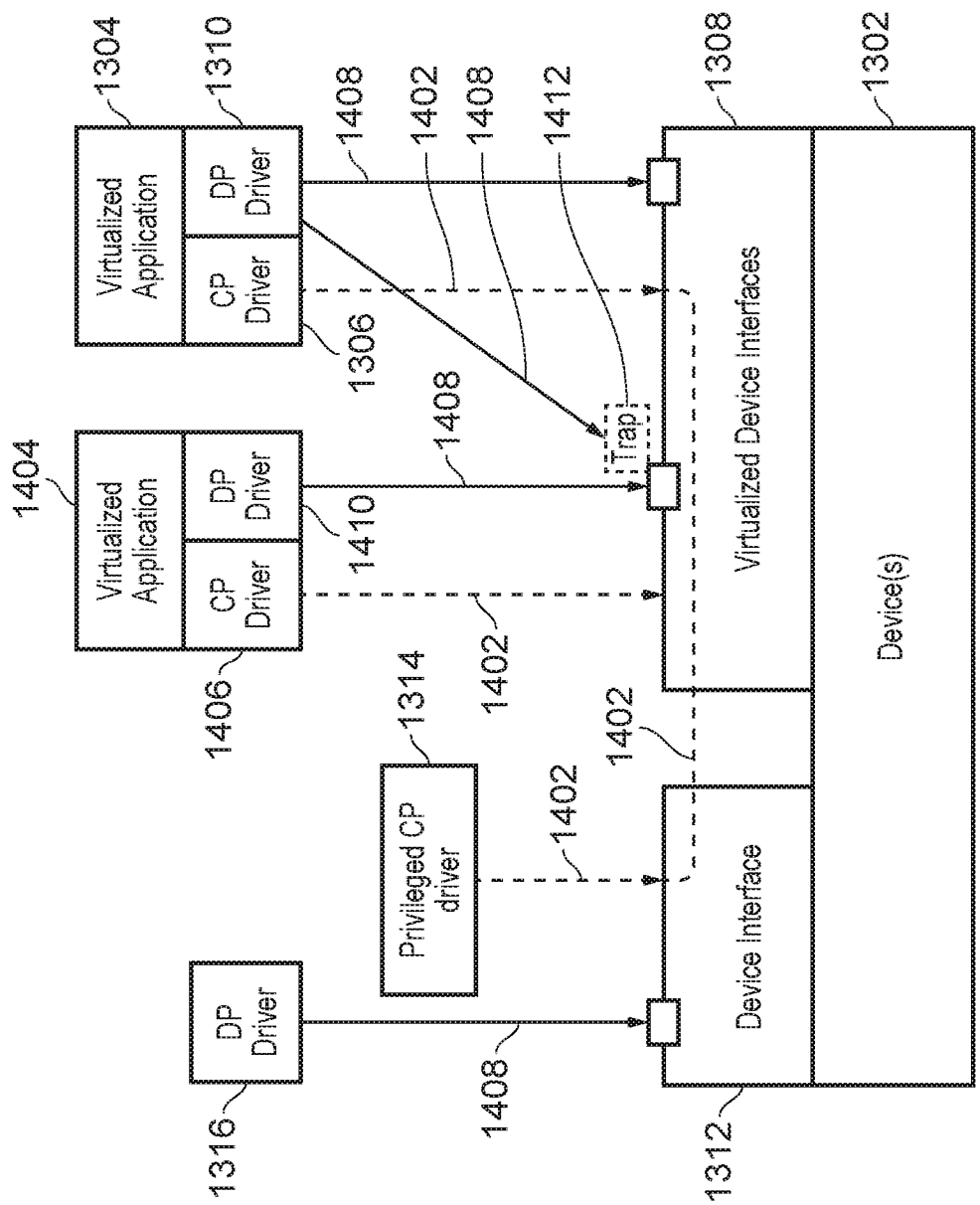

FIG. 14 shows an example of a situation in which application of the present technique is particularly advantageous. In particular, FIG. 14 shows the application of the present technique to device interface overprovisioning.

In FIG. 14, the virtualised device interface 1308 is shared between the virtualised application 1304 depicted in FIG. 13, and an additional virtualised application 1404. The additional virtualised application 1404 is arranged in the same way as the first virtualised application 1304, with a DP driver 1410 and a CP driver 1406. In this example, the virtualised device interface 1308 is overprovisioned, meaning that some of its resources have been allocated to both the first virtualised application 1304 and the second virtualised application 1404, with both believing that they are the only application with access to those resources. Traditionally, memory accesses on both the control path 1402 and the data path 1408 would have to be trapped 1412 in this situation when attempting to access overprovisioned resources. In accordance with the present technique, however, memory accesses on the control path 1402 do not need to be trapped, since they are transparently mediated via the privileged CP driver 1314, by whatever software or hardware is responsible for management of overprovisioned resources.

Figure 15:
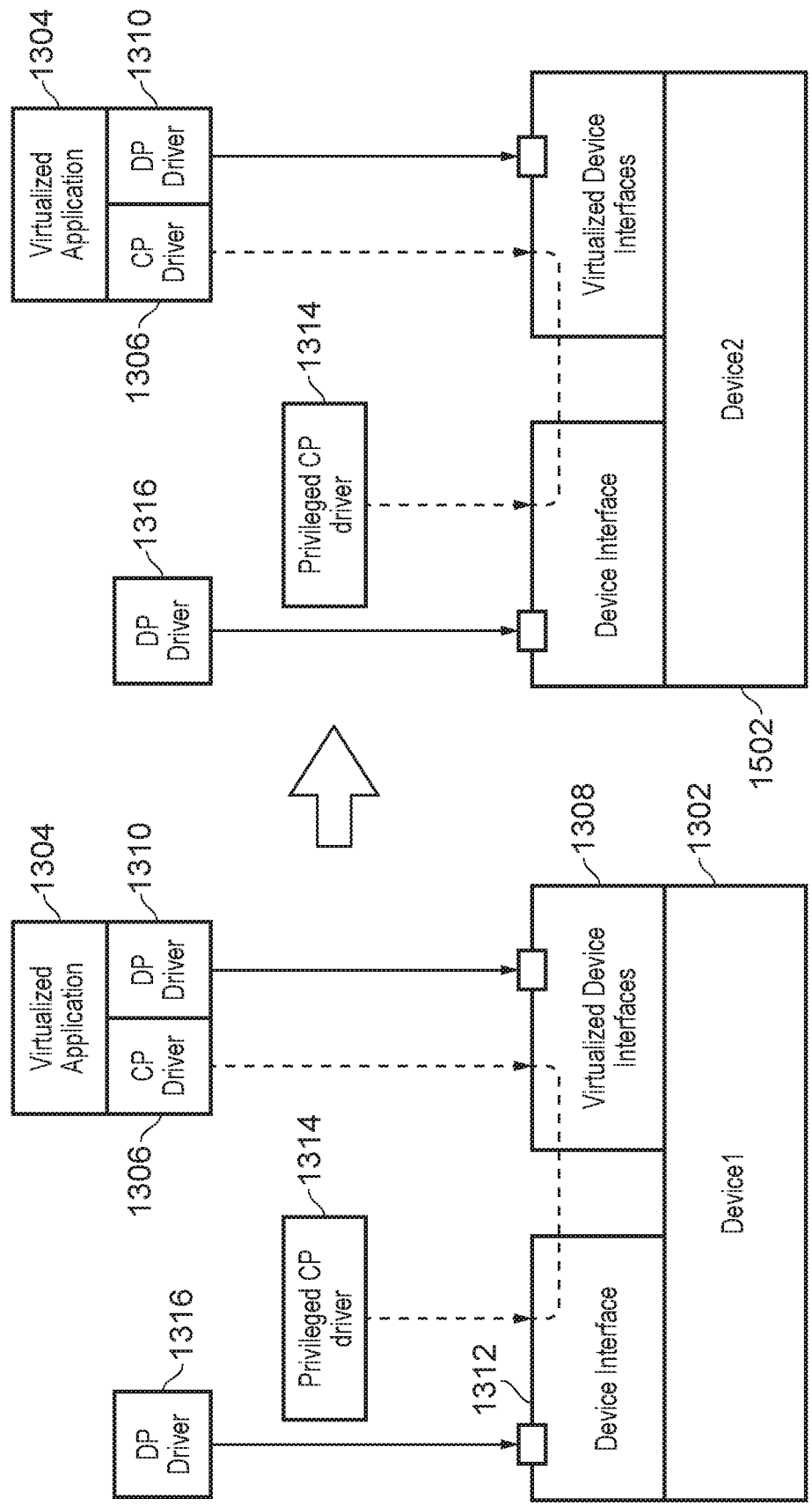

Another example of a situation in which the present technique is particularly advantageous is in live migration, as shown in FIG. 15. In live migration of a virtualised application 1304 from one host device 1302 to another host device 1502, the higher-privileged software pre-copies the assigned contexts from the first device 1302 to the second device 1502, while ensuring that the virtualised application 1304 does not make further changes to the configuration of the device 1302 without permission. Traditionally, this would require specific behaviour to be programmed into the virtualised application 1304 or into the CP driver 1306, but transparent mediation of configuration commands as described in accordance with the present technique means that this is no longer required.

Furthermore, the second device 1502 may not support the exact same feature set as the first device 1302, which would traditionally prevent live migration from successfully being carried out. The present technique, on the other hand, allows the missing functionality of the second device 1502 to be emulated by the higher-privileged software, allowing live migration to be carried out in a wider range of systems. Thus, the present technique improves both the security and the versatility of the system.

Although specific examples have been shown in FIGS. 14 and 15 of situations in which application of the present technique is particularly beneficial, it will be understood that these are merely examples, and that there may be many other situations in which the present technique would provide an advantage.

Figure 16:
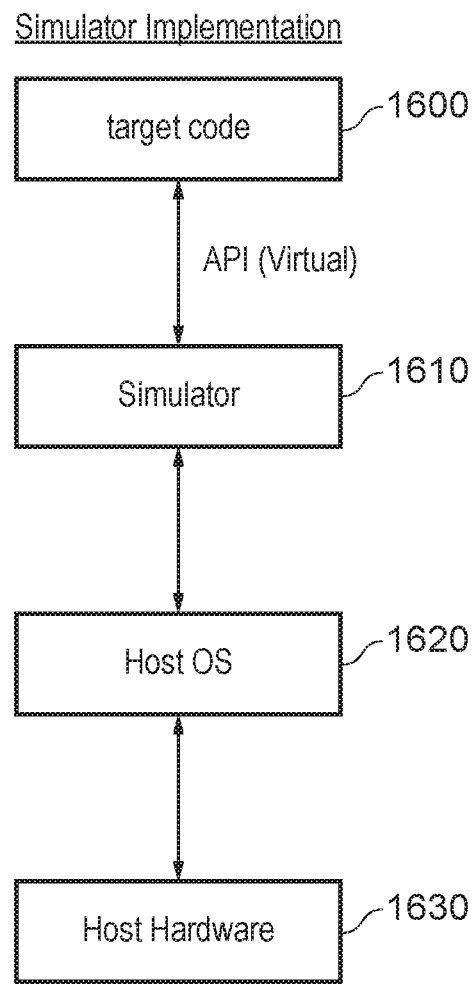
FIG. 16 shows an example of a simulator implementation.

FIG. 16 illustrates a simulator implementation that may be used. Whilst the earlier described embodiments implement the present invention in terms of apparatuses and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 1630, optionally running a host operating system 1620, supporting the simulator program 1610. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 1630), some simulated embodiments may make use of the host hardware, where suitable.

The simulator program 1610 may be stored on a computer-readable storage medium (which may be a non-transitory medium), and provides a program interface (instruction execution environment) to the target code 1600 (which may include applications, operating systems and a hypervisor) which is the same as the application program interface of the hardware architecture being modelled by the simulator program 1610. Thus, the program instructions of the target code 1600, and commands triggered by those instructions, including the configuration requests and responses, mediated requests and mediated responses and device action triggering commands described above, may be executed from within the instruction execution environment using the simulator program 1610, so that a host computer 1630 which does not actually have the hardware features of the apparatus 400 discussed above can emulate these features.

In particular, the functionality of the interface described above may be emulated by program logic within the simulator program 1610. When the target code 1600 includes instructions which would require a configuration request to be sent to the interface, the program logic may be configured to emulate the functions of the interface, either by forwarding a mediated request to higher-privileged software, or by emulating the second software itself by mediating the request itself. The configuration request and response, the mediated request and response, and the process of mediation may, therefore, all be emulated within the simulator code 1610. Hence, in some examples, the second software may actually be the simulator program 1610 itself. Other examples may still have the second software separate from the simulator program 1610.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:

1. An apparatus comprising:
processing circuitry configured to execute software including first software and second software, in which the second software has a higher privilege level than the first software; and
hardware-implemented interface configured to receive, from the processing circuitry, a configuration request from the first software requesting configuration of a hardware accelerator or input/output device;
in which:
the hardware-implemented interface is responsive to receiving the configuration request from the first software to forward a mediated request to the processing circuitry for consideration by the second software, the mediated request being sent to the second software by the hardware-implemented interface, rather than being sent by the first software;
the mediated request comprises a request that the second software having the higher privilege level than the first software determines a mediated response indicating to the hardware-implemented interface whether the hardware-implemented interface should allow or reject the configuration of the hardware accelerator or the input/output device according to the configuration request received by the hardware-implemented interface from the first software; and
the hardware-implemented interface is configured to receive the mediated response from the processing circuitry in response to sending the mediated request.

2. The apparatus of claim 1, in which
the hardware-implemented interface is configured to send a configuration response to the processing circuitry based on the mediated response, the configuration response being a response to the configuration request.

3. The apparatus of claim 2, in which:
when the mediated response indicates that the configuration request from the first software should be rejected, the configuration response comprises an error indication.

4. The apparatus of claim 2, in which:
the processing circuitry is configured to restrict issuing of the mediated response to a certain privilege level or higher.

5. The apparatus of claim 1, in which:
the hardware-implemented interface is configured to trigger the hardware accelerator or the input/output device to be configured based on the mediated response.

6. The apparatus of claim 1, in which:
when in a mediation enabled state, the hardware-implemented interface is configured to forward the mediated request to the processing circuitry in response to the configuration request; and
when in a mediation disabled state, the hardware-implemented interface is configured to suppress forwarding of the mediated request to the processing circuitry in response to the configuration request.

7. The apparatus of claim 6, in which:
in response to receiving the configuration request when in the mediation disabled state, the hardware-implemented interface is configured to send an error indication to the processing circuitry.

8. The apparatus of claim 6, comprising:
a register configured to store an enable indicator indicating whether the mediation enabled state or the mediation disabled state is set.

9. The apparatus of claim 6, in which:
the processing circuitry is configured to set the mediation enabled state or the mediation disabled state by sending a mediation-configure command to the hardware-implemented interface.

10. The apparatus of claim 9, comprising:
a register configured to store an enable indicator indicating whether the mediation enabled state or the mediation disabled state is set;
in which, in response to the mediation-configure command, the hardware-implemented interface is configured to change the value of the enable indicator stored in the register.

11. The apparatus of claim 9, in which:
the processing circuitry is configured to restrict issuing of the mediation-configure command to software of a given privilege level or higher.

12. The apparatus of claim 6, in which:
the hardware-implemented interface is configured to set the mediation enabled state or mediation disabled state separately for at least two types of configuration command; and
in response to a given type of configuration command, the hardware-implemented interface is configured to determine whether to forward the mediated request to the processing circuitry depending on which of the mediation enabled state and mediation disabled state is set corresponding to the given type of the configuration command.

13. The apparatus of claim 1, in which:
the configuration command is associated with a device context identification value indicative of an associated device context, the associated device context comprising at least one parameter associated with the hardware accelerator or the input/output device when used by the first software.

14. The apparatus of claim 1, in which:
the configuration request comprises one of:
a request related to power management of resources of the hardware accelerator or the input/output device;
a request which is unsupported in hardware; and
a request from an unassigned device context.

15. The apparatus of claim 1, in which:
the processing circuitry is configured to send a device action triggering command from the first software to the hardware-implemented interface; and
the hardware-implemented interface is configured to send the device action triggering command to the hardware accelerator or the input/output device and omit sending a mediated request to the processing circuitry in response to the device action triggering command.

16. The apparatus of claim 15, in which:
when the device action triggering command is unsupported by the hardware accelerator or input/output device, the hardware-implemented interface is configured to forward a further mediated request to the processing circuitry in response to the device action triggering command; and
the further mediated request comprises a request that the second software emulates the hardware accelerator or the input/output device to determine a response to the device action triggering command.

17. The apparatus of claim 1, in which
the processing circuitry comprises shared processing circuitry executing both the first software and the second software.

18. The apparatus of claim 1, in which:
the processing circuitry comprises first processing circuitry of a first processing unit and second processing circuitry of a second processing unit separate from the first processing unit; and
the first processing circuitry is configured to execute the first software and the second processing circuitry is configured to execute the second software.

19. A method comprising:
executing software on processing circuitry, the software including first software and second software, in which the second software has a higher privilege level than the first software;
receiving, at a hardware-implemented interface, from the processing circuitry, a configuration request from the first software requesting configuration of a hardware accelerator or input/output device; and
the hardware-implemented interface responding to receiving the configuration request by forwarding a mediated request to the processing circuitry for consideration by the second software, the mediated request being sent to the second software by the hardware-implemented interface, rather than being sent by the first software;
in which the mediated request comprises a request that the second software having the higher privilege level than the first software determines a mediated response indicating to the hardware-implemented interface whether the hardware-implemented interface should allow or reject the configuration of the hardware accelerator or the input/output device according to the configuration request received by the hardware-implemented interface from the first software; and the method comprises the hardware-implemented interface receiving the mediated response from the processing circuitry in response to sending the mediated request.

* * * * *